Figure 1:
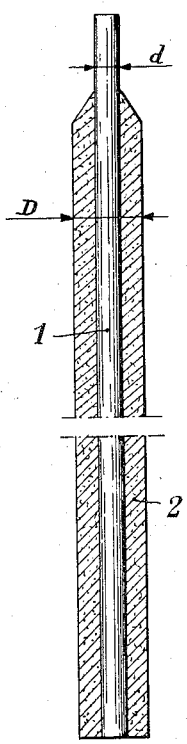

Nov. 18, 1958    J. L. SARAZIN ET AL    2,861,013
ELECTRODES FOR ARC WELDING OF SPECIAL STEEL
Filed July 9, 1953

INVENTORS
Jean Lucien Sarazin
Simone Alice Fracchia
Marcel Moneyron
BY
Barnes, Kisselle, Raisch & Choate
ATTORNEYS

United States Patent Office 2,861,013
Patented Nov. 18, 1958

2,861,013

ELECTRODES FOR ARC WELDING OF SPECIAL STEEL

Jean Lucien Sarazin, Simone Alice Fracchia, and Marcel Moneyron, Neuilly-sur-Seine, France Application July 9, 1953, Serial No. 367,092

Claims priority, application France July 11, 1952

5 Claims. (Cl. 117—207)

The invention relates to electrodes for the arc welding of certain special steels and also for the welding of stainless Cr-Ni and Cr-Ni-Mo steels.

It is well known that in the two latter cases the electrodes for arc welding generally consist of a wire of stainless steel having the same composition as the electrode and which is embedded in a coating.

It is also well known that the normal or conventional coating of an electrode consists of calcium, barium, aluminum, iron, sodium, potassium and the like carbonates, oxides or silicates to which are generally added deoxidizing agents as silicon, titanium, manganese, aluminum, either in the pure state, or allied with iron, as binary or ternary ferro-alloys, such as ferro-manganese, silico-manganese, and the like. The part played by these agents is not only to deoxidize the weld but also to eventually alter the manganese and silicon content of the metal deposit. The percentage of said alloys or ferro-alloys is not generally higher than 35% of the total weight of the coating. The mineral products and ferro-alloys hereinbefore mentioned are mixed with a siccative, such as soda or potash silicate or with a gum in order to obtain a paste which is deposited on the welding wire, by dipping or extrusion and which then forms the conventional coating of the electrode.

It is also known that electrodes of that kind can be manufactured from a soft steel wire embedded in a coating which is provided between the windings of an asbestos thread surrounding the steel wire and consisting for the main part, of non-ferrous alloys (Ni, Cr, Mo) in addition to the normal or conventional ingredients.

Moreover in order to draw as wire the stainless steels the content of Cr of which is higher than 20% with a percentage of Ni of about 10% and a percentage of Mo between 2 to 3%, the foundrymen have some difficulties. The result thereof is that the electrodes of that kind are very obtainable only with difficulty by the conventional methods. In order to avoid these difficulties, the core part of the electrode is sometimes formed with a stainless steel wire with 18% of Cr and 8% of Ni and the coating is then formed with alloys or ferro-alloys containing supplementary contents in Cr, Ni and Mo, in amounts higher than 7% of the weight of the weld metal deposit.

On the other hand, it is also a known fact that the electrodes the core of which is of stainless steel become red hot throughout their length during the welding operation due to their high resistivity; the consequence thereof is that the length of said electrodes must be lesser than that of the electrodes of mild or lightly alloyed steel and the welding current has to be smaller which results in that there is no connection between the melting speeds and the possibilities of the present art.

The invention has for its object the avoidance of said inconveniences in the manufacture and use of such electrodes. It permits direct incorporation, by means of the coating itself, into the weld metal deposit the necessary amounts of Cr, Ni, and Mo in the proportions mentioned hereinafter, to produce an alloy having the following composition by weight.

| | Percent |
|---|---|
| Cr | 19 to 23 |
| Ni | 8 to 11 |
| Mo | 1.7 to 3.5 |

The electrode according to the invention is formed with a mild or extra-mild steel wire embedded in a coating which, in addition to the conventional components, comprises an important quantity hereinafter fixed of Cr, Ni and Mo as metal, alloy or salt. All these components are mixed, according to known methods, with soda or potash silicate. There can also be added a suitable percentage of organic glue in order to facilitate extrusion.

After the coating has been dried, it is burnt at high temperature i. e. between 350° C. and 500° C. in order to extract the water from the mixture and eventually to burn the organic fraction of the glue. It is known in fact, that stainless steels must have the lowest possible content of carbon and hydrogen.

The characteristic composition of the coating according to the invention which is capable of incorporating into the metal deposit, the contents of Cr, Ni and Mo indicated above, is given as follows:

| | |
|---|---|
| Conventional coating | 1,800 g. |
| Cr, Ni, Mo as metal alloy or salt | 3,300 g. to 7,700 g. |
| Weight of dry silicate | 300 g. to 700 g. |
| Weight of dry organic glue | 0 to 100 g. |

The percentage of Ni, Cr, Mo compounds reaches values from 56 to 79% in the total weight of the coating.

On the other hand, the quantity of coating deposited on the wire is so that its weight is nearly equal to that of the wire. More precisely, said quantity is such that the rate between the outer diameter of the coating and the diameter of the steel wire is between 2.05 and 1.7 according to the weight of the above Cr-Ni-Mo mixture and varies conversely with the percentage thereof.

The weight of 7,700 g. corresponds to the diameter 1.7.
The weight of 3,300 g. corresponds to the diameter 2.05.
The respective percentages of the three metals and of their compounds in the weights 3,300 g. to 7,700 g. of the above compositions are the following ones:

| | Percent |
|---|---|
| Ni as powder | 19 to 24 |
| Ferro-chromium with a content of 60 to 65% of Cr | 63 to 77 |
| Ferro-molybdenum with 60 to 65% of Mo or calcium molybdate | 8 to 12 |

An analysis which gives a very good result and forms per se an object of the invention is following.

Wire of mild steel:

| | | |
|---|---|---|
| Conventional coating | 1,800 g. | |
| Ni | 1,100 g. | ⎫ ⎧22% |
| Ferro-chromium | 3,500 g. | ⎬ 5,000 ⎨70% |
| Ferro-molybdenum | 400 g. | ⎭ ⎩8% |
| Dry silicate | 460 g. | |

$$\frac{\text{Diameter of coating}}{\text{Diameter of wire}} = 1.87$$

The conventional coating may be either basic or with a base of lime carbonate and fluorspar or with a base of rutile. It is understood that said coating comprises the conventional ferro-manganese, manganese, ferro-silicon and or ferro-titanium.

Figure 2:
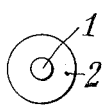

In the drawings, Fig. 1 shows a welding rod constructed in accordance with the present invention in axial section; and Fig. 2 is an end view thereof. In these figures, the wire core is designated 1 and the coating is designated 2. The diameter of the wire 1 is designated d and the outer diameter of the coating 2 is designated D.

We claim:

1. An arc welding electrode for welding stainless steels of the chromium-nickel-molybdenum type and adapted upon deposition by means of arc welding to produce an alloy steel containing from 19 to 23% chromium, from 8 to 11% nickel and from 1.7 to 3.5% molybdenum, said electrode comprising a core of mild carbon steel wire having a coating thereon the outside diameter of which is from 1.7 to 2.05 times the diameter of the wire core, said coating consisting essentially of: a dry powdered mixture of nickel and chromium and molybdenum compounds, 3,300 to 7,700 grams; metallic silicate, 300 to 700 grams; up to 100 grams of an organic glue adapted to facilitate extrusion; and 1,800 grams of an electrode coating composition containing deoxidizing and slag forming ingredients.

2. An arc welding electrode for welding stainless steels of the chromium-nickel-molybdenum type and adapted upon deposition by means of arc welding to produce an alloy steel containing from 19 to 23% chromium, from 8 to 11% nickel and from 1.7 to 3.5% molybdenum, said electrode comprising a core of mild carbon steel wire having a coating thereon the outside diameter of which is from 1.7 to 2.05 times the diameter of the wire core, said coating consisting essentially of a dry powdered mixture of nickel and chromium and molybdenum compounds which comprises from 56 to 79% by weight of the coating, the remainder of said coating consisting essentially of a lesser amount of a silicate binder and deoxidizing and slag forming ingredients, said mixture of nickel and chromium and molybdenum compounds being in the following proportions by weight: nickel, 19 to 24%; ferro-chromium, 63 to 77%; ferro-molybdenum, 8 to 12%.

3. An arc welding electrode for welding stainless steels of the chromium-nickel-molybdenum type and adapted upon deposition by means of arc welding to produce an alloy steel containing from 19 to 23% chromium, from 8 to 11% nickel and from 1.7 to 3.5% molybdenum, said electrode comprising a core of mild carbon steel wire having a coating thereon the outside diameter of which is from 1.7 to 2.05 times the diameter of the wire core, said coating consisting essentially of a dry powdered mixture of nickel and chromium and molybdenum compounds which comprises from 56 to 79% by weight of the coating, the remainder of said coating consisting essentially of a lesser amount of a silicate binder and deoxidizing and slag forming ingredients, said coating being compounded in the following proportions: nickel, 11,000 grams; ferro-chromium, 3,500 grams; ferro-molybdenum, 400 grams; and said remainder of the coating mixture, 2,260 grams.

4. An arc welding electrode for welding stainless steels of the chromium-nickel-molybdenum type comprising a core of mild carbon steel wire having a coating thereon the outside diameter of which is from 1.7 to 2.05 times the diameter of the wire core, said coating consisting essentially of a dry powdered mixture of chromium and nickel and molybdenum compounds which comprises from 56 to 79% by weight of the coating, the remainder of said coating consisting essentially of a lesser amount of a silicate binder and deoxidizing and slag forming ingredients, said electrode being adapted upon deposition by means of arc welding to produce an alloy steel containing from 19 to 23% chromium, from 8 to 11% nickel and from 1.7 to 3.5% molybdenum.

5. An arc welding electrode for welding stainless steels of the chromium-nickel-molybdenum type and adapted upon deposition by means of arc welding to produce an alloy steel containing from 19 to 23% chromium, from 8 to 11% nickel and from 1.7 to 3.5% molybdenum, said electrode comprising a core of mild carbon steel wire having a coating thereon the outside diameter of which is from 1.7 to 2.05 times the diameter of the wire core, said coating consisting essentially of: a dry powdered mixture of nickel and chromium and molybdenum compounds, 3,300 to 7,700 grams; metallic silicate, 300 to 700 grams; and 1,800 grams of an electrode coating composition containing deoxidizing and slag forming ingredients.

References Cited in the file of this patent

UNITED STATES PATENTS

| | | |
|---|---|---|
| 1,893,160 | Clarke | Jan. 3, 1933 |
| 1,926,090 | Frickey et al. | Sept. 12, 1933 |
| 2,016,585 | Basore et al. | Oct. 8, 1935 |
| 2,024,992 | Wissler | Dec. 17, 1935 |
| 2,317,421 | Tholand | Apr. 27, 1943 |
| 2,329,986 | Goodford | Sept. 21, 1943 |
| 2,408,620 | Friedlander | Oct. 1, 1946 |